US008420149B2

(12) United States Patent
Kakudo et al.

(10) Patent No.: US 8,420,149 B2
(45) Date of Patent: Apr. 16, 2013

(54) FERMENTED MALT BEVERAGE

(75) Inventors: Yoichi Kakudo, Hyogo (JP); Manabu Yoshida, Tokyo (JP); Takashi Kimura, Osaka (JP); Yasutsugu Kawasaki, Kanagawa (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 1652 days.

(21) Appl. No.: 10/582,336

(22) PCT Filed: Dec. 10, 2004

(86) PCT No.: PCT/JP2004/018460
§ 371 (c)(1),
(2), (4) Date: May 25, 2007

(87) PCT Pub. No.: WO2005/056746
PCT Pub. Date: Jun. 23, 2005

(65) Prior Publication Data
US 2007/0275120 A1 Nov. 29, 2007

(30) Foreign Application Priority Data

Dec. 11, 2003 (JP) ................................ 2003-413894
Oct. 27, 2004 (JP) ................................ 2004-312258

(51) Int. Cl.
*A23L 1/202* (2006.01)
*C12G 3/00* (2006.01)

(52) U.S. Cl.
USPC ........................................... 426/592; 426/16

(58) Field of Classification Search ............ 426/11, 426/16, 18, 29, 592, 600
See application file for complete search history.

(56) References Cited

U.S. PATENT DOCUMENTS

| 5,618,572 A * | 4/1997 | Tripp et al. ................ 426/592 |
| 2005/0220935 A1* | 10/2005 | Oono ............................ 426/11 |

FOREIGN PATENT DOCUMENTS

| JP | 60241883 | * 11/1985 |
| JP | 7-236467 | 9/1995 |
| JP | 8-322545 | 12/1996 |
| JP | 2001-299322 | 10/2001 |

OTHER PUBLICATIONS

Japanese Spirits. <http://www.jal.com/it/shochu/whats/jshochu.html>; accessed on Apr. 22, 2009.*
Brewing Techniques: "Wheat Beer". <http://www.brewingtechniques.com/library/styles/1_1style.html>; accessed on Apr. 22, 2009.*
Drinkmixer Baileys Irish Creme, published on Oct. 11, 2003, retrieved on Nov. 17, 2009.*
Global Gourmet, published on Oct. 4, 2003, retrieved on Nov. 21, 2009.*
Drinkmixer Guiness Stout, published on Oct. 9, 2003, retrieved on Nov. 17, 2009.*
Guiness, published on Apr. 16, 2003, retrieved on Nov. 17, 2009.*
The Webtender, "Carbomb", published on Feb. 10, 2003, retrieved on Nov. 16, 2009.*
Drinkmixer Jameson's Whiskey, published on Oct. 19, 2003, retrieved on Nov. 17, 2009.*
Japan Taxes on Alcoholic Beverages, World Trade Organization, Jul. 1996.*
Human translation of Hoppy de Happy, translated Dec. 2009.*
Search Report dated Mar. 15, 2005 for International Application No. PCT/JP2004/018460 filed Dec. 10, 2004 [translated].
Hoppy De Happy-To, Kabushiki Kaisha Asupekuto, "Hoppy de Happy Dokuhon", Aug. 22, 2000, pp. 30-32, 34-35 [translated].
Chikashi Kitajima et al., "Beer no Hanashi", Gihodo Shuppan Co., Ltd., Apr. 5, 1994, pp. 169-170 [translated].
Ryozo Sotoike, "Sake no Jiten", Kabushiki Kaisha Tokyodo Shuppan, Jun. 25, 1975, p. 124 [in Japanese].

* cited by examiner

*Primary Examiner* — Chhaya Sayala
*Assistant Examiner* — W Moore
(74) *Attorney, Agent, or Firm* — Drinker Biddle & Reath LLP

(57) ABSTRACT

To provide a malt fermented beverage having refreshing finish, namely clear taste while ensuring robust feel by making use proportion of malt in starting materials high. Provided is a malt fermented beverage which includes an alcohol-containing material obtained by fermentation using wheat or barley as a part of starting material, serving as a component A; and an alcohol-containing distillate obtained by distilling an alcohol-containing material at least partly made of wheat/barley, serving as a component B; and is produced by adding the component B to the component A. Preferably, the component A is beer, and the component B is mugi shochu.

15 Claims, No Drawings

FERMENTED MALT BEVERAGE

The priority applications, Japanese patent application no. 2003-413894, filed on Dec. 11, 2003 and Japanese patent application no. 2004-312258, filed on Oct. 27, 2004, are incorporated by reference herein in their entirety.

TECHNICAL FIELD

The present invention relates to a malt fermented beverage having novel flavor and a method of producing the same. More specifically, the present invention relates to a malt fermented beverage offering refreshing finish and clear aftertaste, namely improved "crispness" as well as malt-derived robust feel by adding an alcohol-containing distillate, and a method of producing the same.

BACKGROUND ART

In the past, attempts to create novel flavors in alcoholic beverages have been actively made. In respect of beer and happoshu (low-malt beer beverage), for example, those having various flavors have been developed and provided to satisfy recent wide varieties of tastes of consumers. In such attempts, impartment of refreshing finish, which is so-called "crispness" is one of the problems in production of beer and low-malt beer beverages.

Production of malt fermented beverages with crispness is achieved to some extent by reducing use proportion of malt in starting materials. Such a method, however, tends to degrade robust feel and refreshing finish in comparison with a malt fermented beverage in which malt is used at higher proportion. For addressing this, a fermented malt alcohol beverage offering clean aftertaste, namely "crispness" by adding trehalose, which is disaccharide, is proposed (Patent document 1).

As an attempt to improve flavor, an alcoholic beverage produced by combining plural kinds of liquor components is also proposed, and as such, a method of producing alcoholic beverages, which improves drinkability of cold "sake" (Japanese rice wine) by adding an appropriate amount of Mirin (Japanese sweet rice wine) to sake, is proposed (Patent document 2). Also proposed is a method of improving taste of fermented barley malt beer beverage which involves aging in a used whisky or wine barrel after fermentation in order to impart bold and mild taste to the beer (Patent document 3).

These solutions, however, are still insufficient to produce a malt fermented beverage with crisp taste without impairing the robust feel in respect of flavor of beer or low-malt beer beverage. In addition, these studies for developing malt fermented beverages that offer such special flavors are not necessarily satisfactory.

Patent document 1: Japanese Patent Laid-Open Publication No. 2001-299322
Patent document 2: Japanese Patent Laid-Open Publication No. Hei 8-322545
Patent document 3: Japanese Patent Laid-Open Publication No. Hei 8-236467

DISCLOSURE OF THE INVENTION

Problem to be Solved by the Invention

In view of the above, it is an object of the present invention to provide a malt fermented beverage offering refreshing finish, i.e., crisp taste while ensuring robust feel by using malt at higher proportion in starting materials in malt fermented beverages.

In order to achieve the above object, the inventors of the present application made various examinations and found that crispness in finish can be imparted without degradation of robust feel of malt fermented beverage by adding a distillate produced by distillation of an alcohol-containing material, in particular, a distillate produced by distillation of an alcohol-containing material partly made of wheat or barley, to a malt fermented beverage having high use proportion of malt in starting materials, and accomplished the present invention.

Means for Solving the Problem

Specifically, the present invention includes the following aspects.

1. A malt fermented beverage which is liquors partly made of malt and having sparkling characteristic, the beverage being prepared by using a distillate of an alcohol-containing material at least partly made of wheat or barley as a part of starting materials of the beverage;
2. A malt fermented beverage comprising:
   an alcohol-containing material partly made of wheat or barley and produced by fermentation, serving as a component A; and
   an alcohol-containing distillate obtained by distilling an alcohol-containing material at least partly made of wheat or barley, serving as a component B,
   wherein the malt fermented beverage is produced by mixing the component A and the component B;
3. The malt fermented beverage according to the above 2, wherein at least malt is used as a starting material for the alcohol-containing material of the component A;
4. The malt fermented beverage according to the above 2, wherein the alcohol-containing material of the component A is made of at least malt, hop and water, and other starting materials as is necessary;
5. The malt fermented beverage according to the above 4, wherein the other starting materials are selected from the group consisting of rice, corn, sorghum, white potato, starch, sugars, wheat or barley other than malt, a bittering agent, and a coloring agent;
6. The malt fermented beverage according to the above 2, wherein the alcohol-containing material of the component A is beer or a low-malt beer beverage;
7. The malt fermented beverage according to any one of the above 2 to 6, wherein the alcohol-containing material of the component A is an alcohol-containing material having malt proportion of 20% or higher;
8. The malt fermented beverage according to any one of the above 2 to 6, wherein the alcohol-containing material of the component A is an alcohol-containing material having malt proportion of 40% or higher;
9. The malt fermented beverage according to the above 2, wherein the alcohol-containing distillate of the component B is shochu (Japanese distilled liquor), whisky, vodka, spirits or raw material alcohol;
10. The malt fermented beverage according to the above 2, wherein wheat or barley used as a starting material in the alcohol-containing distillate of the component B is barley or wheat;
11. The malt fermented beverage according to the above 2, wherein the alcohol-containing distillate of the component B is "mugi shochu" (shochu distilled from wheat or barley);

12. The malt fermented beverage according to the above 2, wherein the alcohol-containing distillate of component B is one that is distilled in a batch distiller;
13. The malt fermented beverage according to the above 11, wherein the mugi shochu is otsu-rui shochu;
14. The malt fermented beverage according to the above 13, wherein the mugi shochu is mugi shochu that is obtained from starting materials including wheat or barley, malted wheat or barley and water;
15. The malt fermented beverage according to the above 2, wherein the alcohol-containing distillate of the component B is one that is distilled in a continuous distiller;
16. The malt fermented beverage according to the above 2, wherein the alcohol-containing distillate of the component B is wheat spirits;
17. The malt fermented beverage according to the above 2, wherein the alcohol-containing material of the component A is an alcohol-containing material having malt proportion of 100%, and the distillate of alcohol-containing material of the component B is ko-rui mugi shochu;
18. The malt fermented beverage according to the above 2, wherein the alcohol-containing material of the component A is an alcohol-containing material having malt proportion of 40 to 60%, and the distillate of alcohol-containing material of the component B is wheat spirits;
19. The malt fermented beverage according to the above 2, wherein an alcohol content of the alcohol-containing distillate of the component B is from 25 to 45%;
20. The malt fermented beverage according to the above 1 or 2, wherein an alcohol content of the malt fermented beverage is from 1 to 15%;
21. The malt fermented beverage according to the above 2, wherein the alcohol-containing material of the component A and the alcohol-containing distillate of the component B are mixed in a volume ratio of 99.9:0.1 to 80:20; and
22. The malt fermented beverage according to the above 2, wherein a ratio between an alcohol content from the alcohol-containing material of the component A and an alcohol content from the alcohol-containing distillate of the component B is in a range of 97.5:2.5 to 90:10.

In another aspect, the present invention provides:
23. A method of producing a malt fermented beverage, the beverage comprising an alcohol-containing material partly made of wheat or barley and produced by fermentation (named component A); and an alcohol-containing distillate obtained by distilling an alcohol-containing material at least partly made of wheat or barley (named component B), the method comprising mixing the component A and the component B to produce the malt fermented beverage.

Specifically, a fundamental aspect of the present invention is a malt fermented beverage partly made of malt and having sparkling characteristic, the beverage being prepared by using an alcohol-containing distillate obtained by distillation of an alcohol-containing material at least partly made of wheat or barley, as a part of starting materials of the beverage.

More specifically, the present invention provides a malt fermented beverage which comprises:

an alcohol-containing material partly made of wheat or barley and produced by fermentation, serving as a component A; and an alcohol-containing distillate obtained by distilling an alcohol-containing material at least partly made of wheat or barley, serving as a component B, wherein the malt fermented beverage is produced by mixing the component A and the component B.

Effect of the Invention

According to the present invention, a malt fermented beverage made of starting materials containing high use proportion of malt, and offering crisp taste without sacrificing robust feel and refreshing finish as beer tastes, and satisfying the current diversified tastes of consumers is provided.

Conventional so-called happoshu (low-malt beer beverages) realize crisp finishing aftertaste but fail to give sufficient robust feel as is given by beer. According to the present invention, however, by providing a malt fermented beverage that secures malt-derived robust feel as beer taste, as well as crispness after drinking, such tastes of consumers are satisfied.

BEST MODE FOR CARRYING OUT THE INVENTION

A malt fermented beverage provided by the invention means a fermented beverage partly made of wheat or barley, and preferably an alcohol-containing beverage partly made of malt among wheat or barley. Concrete examples include beer, happoshu (low-malt beer beverage), miscellaneous liquors, and low-alcohol malt fermented beverages (e.g., malt fermented beverage of alcohol content <1%), which are fermented malt beverages classified into beer, low-malt beer beverage, liqueurs, spirits according to the Japanese Liquor Tax Law.

Although the alcohol content of the malt fermented beverage provided by the present invention is not particularly limited, it is preferably from 1 to 15% (v/v). In particular, an alcoholic concentration which is typical for malt fermented beverages such as beer and low-malt beer beverages that are favored by consumers, namely in the range of 3 to 8% (v/v) is preferred.

As described above, a malt fermented beverage provided by the present invention essentially comprises:

an alcohol-containing material obtained by fermentation which is partly made of wheat or barley, serving as a component A; and an alcohol-containing distillate obtained by distillation of an alcohol-containing material at least partly made of wheat or barley, serving as a component B, and is produced by mixing the component A and the component B.

The wording "an alcohol-containing material obtained by fermentation which is partly made of wheat or barley" used herein for the component A means alcohol-containing materials obtained by fermentation using later defined wheat or barley as a part of starting materials. Concrete examples include beer taste beverages such as beer, low-malt beer beverages, miscellaneous liquors, and low-alcohol malt fermented beverages (e.g., malt fermented beverage of alcohol content <1%). These may be diluted in water before use.

The wheat or barley used as a starting material of the component A is a wheat-derived processed material commonly used as starting materials of beer and low-malt beer beverages, and examples thereof include malt, barley, pearl barley, barley extract, barley flake, wheat, adlay, rye, oat, and the like. Among these, malt is preferably used.

In the present invention, other materials used as starting materials of the component A include materials other than malt, hop and water which are main starting materials for malt low-malt beer beverages, and examples thereof include rice, corn, sorghum, white potato, starch, sugars, wheat or barley other than malt, bittering agents, and coloring agents.

By the term "bittering agent" used herein, bittering agents commonly used as a starting material of beer and low-malt beer beverage such as iso-humulones and reduced iso-humulones are meant. By the term "coloring agent" used herein, coloring agents commonly used as a starting material of beer and low-malt beer beverages such as caramel are meant.

The use proportion of malt used herein, which is also called "malt proportion," means a proportion by weight of malt in saccharine materials such as malt, rice, corn, sorghum, potato, starch, wheat or barley other than malt, and sugars. For example, beer having a malt proportion of 100% is usually called all-malt beer.

In the malt fermented beverage provided by the present invention, robust feel and refreshing finish are ensured by increasing malt proportion in starting materials, and hence the alcohol-containing material as the component A preferably has malt proportion of 20% or more, especially, 50% or more.

The alcohol-containing material as the component A may be produced in a known method for production of beer and low-malt beer beverages. In this case, the alcohol content in the alcohol-containing material which is the component A is not particularly limited, but may be adjusted in consideration of a design value of alcohol concentration in the alcohol-containing material which is a final product. For example, when a final malt fermented beverage is modified to have flavor of beer taste, the alcohol content may be about 0.5 to 7%.

On the other hand, "an alcohol-containing distillate obtained by distillation of alcohol-containing material at least partly made of wheat or barley" (hereinafter, simply called "alcohol-containing distillate") which is the component B to be added to the alcohol-containing material which is the above-described component A, is obtained by distilling, in a distiller, said alcohol-containing material which is at least partly made of wheat or barley. Therefore, examples of wheat or barley used as a starting material of the component B include malt, wheat or barley malt, barley, pearl barley, barley extract, barley flake, wheat, adlay, rye, oat, and the like.

The alcohol-containing distillate mentioned above should be at least partly made of wheat or barley and produced by distillation. Since the alcohol-containing material which is the component A is made of starting materials having high use proportion of malt, it is necessary to use wheat or barley at least as a part of starting materials in the alcohol-containing distillate which is the component B so as not to impair the flavor.

As such an alcohol-containing distillate which is the component B, those at least partly made of wheat or barley such as shochu (Japanese distilled spirits), whiskey, vodka and spirits, and raw material alcohols. Among these, shochu and spirits are preferred for imparting crispness as aftertaste of drinking to a malt fermented beverage which is a final product.

The term "shochu" used herein means liquors produced by fermentation of a starting material such as wheat or barley, rice, buckwheat and the like serials or potatoes such as sweet potato using mainly *aspergillus* and yeast, followed by distillation. In the shochu used as the alcohol-containing distillate of the component B in production of the malt fermented beverage of the present invention, those partly made of wheat or barley are preferably used among shochu such as mugi shochu (shochu distilled from wheat or barley), rice shochu, buckwheat shochu, potato shochu, honkaku shochu (genuine shochu), and Awamori. In the present invention, the expression "shochu partly made of wheat or barley" embraces those using malted wheat or barley instead of "koji (malted rice)" as well as those using wheat or barley as a part of starting materials. In the present invention, as the alcohol-containing distillate which is the component B, shochu made mainly of wheat or barley and using malted wheat or barley instead of koji (generally called "mugi shochu") is particularly preferred. Among others, mugi shochu made of barley, malted wheat or barley and water is preferred.

The term spirits used herein refers to liquors obtained by saccharification of a starting material such as wheat or barley, rice, buckwheat and the like serials or sweet potato, white potato, cassava and the like potatoes using malt and an enzymatic agent if needed, followed by fermentation by yeast, and distillation. As to the spirits used as the alcohol-containing distillate which is the component B in production of the malt fermented beverage of the present invention, those partly made of wheat or barley are preferably used. Among others, wheat spirits using wheat as wheat or barley is preferably used.

In production of the alcohol-containing distillate, which is the component B, the production condition such as distillation method and number of times to distillate is not particularly limited.

When shochu is used as the alcohol-containing distillate, it may be either ko-rui shochu (shochu produced by distilling an alcohol-containing material in a continuous distiller, alcohol content <36%) or otsu-rui shochu (shochu produced by distilling an alcohol-containing material in a batch distiller, alcohol content ≦45%).

When wheat spirits is used as the alcohol-containing distillate, those produced by distilling an alcohol-containing material in a continuous distiller may be used. Also, those having an alcohol content of 36% or more are preferably used.

The alcohol-containing distillate which is the component B may be appropriately used depending on the malt proportion of the alcohol-containing material which is the component A. For example, when the malt proportion of the component A is as low as 50%, wheat spirits may be used as the component B, while when the malt proportion of the component A is 100%, mugi shochu (otsu-rui) may be used as the component B.

The alcohol content of the alcohol-containing distillate which is the component B is not particularly limited. However, the alcohol concentration may be appropriately determined in consideration of the design value of alcohol concentration of the malt fermented beverage which is a final product and the use proportion of the alcohol-containing distillate, relative to the component A. When shochu is used as the alcohol-containing distillate, the alcohol content of the alcohol-containing distillate is preferably 10 to 90%, in particular, 25 to 45% in light of impartment of "crispness" as aftertaste of drinking, influence of flavor from shochu, and robust feel of beer taste beverage in the malt fermented beverage which is a final product provided by the present invention.

The malt fermented beverage provided by the present invention is produced by adding the component B to the component A and mixing them. The way of adding and mixing is not particularly limited. The mixing ratio between the component A and the component B may be appropriately selected in accordance with the flavor design requested for the malt fermented beverage or in consideration of the flavor characteristics of the component A and the component B.

In the malt fermented beverage provided by the present invention, when a flavor characteristic of a beer taste beverage is requested, malt-derived robust feel and refreshing feel, combined with "crispness" after drinking are desired, and in order to achieve this, flavor from component B should not be too strong but enough to offer "crispness" after drinking. For achieving this, the ratio between alcohol content from the component A and alcohol content from the component B is preferably in the range of 99.5:0.5 to 80:20, and especially in the range of 97.5:2.5 to 90:10.

In order to achieve the above ratio of origins of alcohol content, mixing amounts (mixing volume proportions) of the component A and the component B may be appropriately set depending on the alcohol concentrations of the component A and the component B. It should be selected in such a range that will not impair the malt-derived robust feel as beer taste beverage in the malt fermented beverage which is a final product provided by the present invention. For realizing this, the proportion by volume of the component B is preferably 20% or less. The lower limit of the volume proportion of the component B is not limited insofar as "crispness" after drinking is imparted to the malt fermented beverage which is a final product, and for example, 0.1% or higher.

EXAMPLES

The present invention will now be explained in more detail by way of Examples and Comparative Examples.

Example 1

As the component A, beer having malt proportion of 100% and 5% of alcohol content was prepared according to a prescribed method.

As the component B, mugi shochu having an alcohol content of 44.0% the raw materials of which are wheat or barley and water was prepared in accordance with a prescribed method using malted wheat or barley instead of koji in fermentation, and subsequent distillation.

The component A and the component B thus prepared were mixed in the proportions of alcohol contents from A and B listed in Table 1, and malt fermented beverages 1 to 5 (Inventive products 1 to 5) having a total alcohol content of 5.0% were prepared.

Before mixing, beer which is the component A was appropriately diluted in water so that the total alcohol content of the objective malt fermented beverage was 5.0%.

TABLE 1

|  | Inventive Product | | | | | Comparative Ex. | |
| --- | --- | --- | --- | --- | --- | --- | --- |
|  | 1 | 2 | 3 | 4 | 5 | 1 | 2 |
| Ratio between alcohol content from A and alcohol content from B | | | | | | | |
| From A | 99 | 97.5 | 95 | 90 | 80 |  |  |
| From B | 1 | 2.5 | 5 | 10 | 20 |  |  |
| Results of taste sensory test | | | | | | | |
| Robust feel | 4.8 | 4.8 | 4.8 | 3.9 | 2.9 | 4.9 | 1.2 |
| Crispness | 3.0 | 4.1 | 4.4 | 4.1 | 4.3 | 2.4 | 4.4 |

For Comparative Examples, beer (malt proportion 100%) and a low-malt beer beverage (malt proportion 25%) as shown below were used.

Comparative Example 1 beer having an alcohol content of 5.0% (malt proportion 100%) was prepared according to a prescribed method.

Comparative Example 2 a low-malt beer beverage having alcohol content of 5.0% (malt proportion 10%) was prepared according to a prescribed method.

Taste Sensory Test:

Each malt fermented beverage thus prepared was subjected to a taste sensory test.

Test items included,
(1) Body and robust feel as beer taste, and
(2) Crispness after drinking.

Evaluation tests by eight special panelists were carried out in accordance with a scoring method, and an average score was calculated and shown in Table.

The scores were set as follows.
"Sufficiently strong"=5 points
"Strong"=4 points
"Normal"=3 points
"Weak"=2 points
"None"=1 point As evidenced from the results shown in the above Table, Comparative Example 2 having low malt proportion showed improved crispness and significantly reduced robust feel in contrast to Comparative Example 1.

On the other hand, the malt fermented beverages provided by the present invention, in particular, the inventive products 2 to 4 showed excellent body and robust feel of beer taste, and were imparted with refreshing "crispness" as aftertaste of drinking.

Example 2

As the component A, beer having malt proportion of 100% and an alcohol content of 5% which was similar to that in Example 1 was prepared according to a prescribed method.

As the component B, rice shochu made of rice using malted rice (alcohol content 44%), mugi shochu made of wheat or barley using molted wheat or barley (alcohol content 44%), commercially available brandy based on grape and having an alcohol content of 40% (SUNTORY brandy XO deluxe), or commercially available malt-based whisky having an alcohol content of 43% (SUNTORY pure malt whisky YAMAZAKI (Trade mark) 12 years) was used.

The component A and the component B were mixed so that the ratio between alcohol content from the component A and alcohol content from the component B was 95:5. The beer of the component A was appropriately diluted in water so that the total alcohol content of the objective malt fermented beverage was 5.0%.

Each malt fermented beverage thus prepared was subjected to a taste sensory test, and the results are shown in Table.

Evaluation was carried out by eight special panelists similarly to Example 1 about the following evaluation items: (1) body and robust feel as beer taste, (2) crispness after drinking, and (3) drinkability.

Evaluation methods for (1) body and robust feel as beer taste, and (2) crispness after drinking are as same as those in Example 1, and scores for (3) drinkability were defined as follows.
"Quite drinkable"=5 points
"Drinkable"=4 points
"Normal"=3 points
"Undrinkable"=2 points
"Quite undrinkable"=1 point

TABLE 2

|  | Malt fermented beverage | | | |
| --- | --- | --- | --- | --- |
|  | Comparative Ex. 3 | Inventive Product 6 | Comparative Ex. 4 | Inventive Product 7 |
| Component A | Beer having malt proportion of 100% | | | |
| Component B | Rice shochu | Mugi shochu | Brandy | Whisky |
| Presence/absence of wheat/barley component in B | Absent | Present | Absent | Present |
| Results of taste sensory test | | | | |
| Robust feel | 4.7 | 4.8 | 4.5 | 4.7 |
| Crispness | 3.8 | 4.6 | 3.1 | 4.1 |
| Drinkability | 3.6 | 4.8 | 2.5 | 4.3 |

The results shown in Table 2 revealed that robust feel is excellent in all beverages and that when an alcohol-containing distillate obtained by distillation of alcohol-containing material which is partly made of wheat or barley is added as the component B, refreshing crispness as aftertaste of drinking is imparted together with drinkability.

Example 3

Effect of adding the component B was evaluated with different malt proportions of the component A.

As the component A, malt fermented beverages having malt proportion of 10%, 20%, 40% and 100%, respectively and an alcohol content of 5% were prepared according to a prescribed method.

As the component B, spirits having an alcohol content of 44.0% made of wheat and water, through saccharification, fermentation, and distillation (using continuous distiller), was prepared according to a prescribed method.

The component A and the component B were mixed so that the ratio of alcohol content from the component A and alcohol content from the component B was 95:5, and malt fermented beverage of component A was appropriately diluted in water so that the objective malt fermented beverage had total alcohol content of 5.0%.

For Comparative Examples, beers (or low-malt beer beverages) having various malt proportions and lacking the component B were evaluated.

Evaluation items and evaluation method are as same as those in Example 1. Results are shown in Table 3 below.

TABLE 3

|  | Inventive Product | | | | Comparative Example | | | |
|---|---|---|---|---|---|---|---|---|
|  | 8 | 9 | 10 | 11 | 5 | 6 | 7 | 8 |
| Malt proportion in Component A (%) | 10 | 20 | 40 | 100 | 10 | 20 | 40 | 100 |
| Component B | Wheat spirits | | | | Absent | | | |
| Sensory evaluation test | | | | | | | | |
| Robust feel | 1.3 | 3.1 | 4.2 | 4.8 | 1.2 | 3.0 | 4.2 | 4.9 |
| Crispness | 4.2 | 4.2 | 3.2 | 3.0 | 4.4 | 3.5 | 2.2 | 2.0 |

As is apparent from the results in Table, in the present inventive products, addition of the component B resulted in improvement of crisp taste without degradation of robust feel for any beverages having different malt proportions of 10%, 20%, 40%, and 100%. In particular, when the malt proportion was from 20% to 100%, especially 40% or higher, significant crispness imparting effect was observed.

These results demonstrated that by combining the component B with various malt use proportions of the component A in malt fermented beverage, malt fermented beverages that offer robust feel, as well as refreshing finish and clear taste can be provided.

Example 4

Different combination of malt proportion in starting material for the component A, and kind of the component B were examined.

As the component A, malt fermented beverages having malt use proportion of 49% and 100%, and an alcohol content of 5% were prepared according to a prescribed method.

As the component B, mugi shochu (otsu-rui) or wheat spirits was used.

As mugi shochu (otsu-rui), the one obtained from barley by distillation in batch distiller using malted barley was used (alcohol content 44%).

As wheat spirits, the one obtained from wheat by distillation of alcohol-containing material in a continuous distiller was used (alcohol content 44%).

The component A and the component B were mixed so that the ratio of alcohol content from the component A and alcohol content from the component B was 95:5. Malt fermented beverage of the component A was appropriately diluted in water so that the objective malt fermented beverage had total alcohol content of 5.0%.

For Comparative Example, low-malt beer beverages lacking the component B (malt proportion: 49% or 100%) were evaluated.

Evaluation items and evaluation method are as same as those in Example 1.

TABLE 4

|  | Inventive Product | | Comp. Ex. | Inventive Product | | Comp. Ex. |
|---|---|---|---|---|---|---|
|  | 12 | 13 | 9 | 14 | 15 | 10 |
| Malt proportion in Component A (%) | 49 | 49 | 49 | 100 | 100 | 100 |
| Component B | Mugi shochu (otsu-rui) | Wheat spirits | Absent | Mugi shochu (otsu-rui) | Wheat spirits | Absent |
| Results of sensory evaluation | | | | | | |
| Robust feel | 4.3 | 4.2 | 4.4 | 4.8 | 4.8 | 4.9 |
| Crispness | 4.2 | 4.5 | 3.2 | 3.8 | 3.5 | 2.5 |

In the inventive products, crispness was improved without degradation of robust feel by adding mugi shochu (otsu-rui) or wheat spirits as the component B in any beverage regardless of the malt proportion.

When a malt fermented beverage having malt proportion of 49% was used as the component A, the evaluated crispness was better in the case of using mugi shochu (otsu-rui) than using wheat spirits as the component B.

On the other hand, when a malt fermented beverage having malt proportion of 100% was used as the component A, the evaluated crispness was better in the case of using wheat spirits than using mugi shochu (otsu-rui) as the component B.

These results are attributable to difference in strength of wheat or barley-derived flavor in starting materials. In brief, since the component B produced in a batch distiller contains some degree of flavors from its starting material, it is possible to impart crispness more effectively when the malt proportion of the component A is high. On the other hand, since the component B produced in a continuous distiller contains less flavor components derived from the starting material, it may be favorably used when malt proportion of the component A is not too high (for example, malt proportion: 49%).

Example 5

As the component A, a malt beverage having malt proportion of 60% was prepared.

Using a starting material composition of 60% malt and 50% sugar solution, wort was prepared in accordance with a prescribed method. As the sugar solution, a commercially available sugar solution was used. To saccharified malt was added the sugar solution to give wort having an extract content of 12%. To this was added commercially available beer yeast (Weihenstephan-34), and then fermentation was effected according to a prescribed method, to give the component A having an alcohol content of 5.5%.

As the component B, wheat spirits was used. As the wheat spirits, the one that was produced from wheat by distilling an alcohol-containing material in a continuous distiller was used (alcohol content 44%).

To 1500 L of the component A was added 9.7 L of the component B. The component B was added and mixed in a fermentation tank just before a filtering process for removal of yeast in the production process of the component A. The obtained fermented beverage was filtered sterilely and packed in a can, to produce a malt beverage of the present invention.

The obtained fermented beverage had both robust feel and crispness.

Example 6

As the component A, a malt beverage having malt proportion of 40% was produced.

Using a starting material composition of 40% malt, 10% wheat or barley, and 50% sugar solution, wort was produced in accordance with a prescribed method. As the sugar solution, a commercially available sugar solution was used. After saccharifying malt and wheat or barley, the sugar solution was added to give wort having extract content of 12%. To this was added commercially available beer yeast (Weihenstephan-34), and then fermentation was effected according to a prescribed method, to give the component A having an alcohol content of 5.5%.

As the component B, wheat spirits was used. As the wheat spirits, the one that was produced from wheat by distilling an alcohol-containing material in a continuous distiller was used (alcohol content 44%).

To 1500 L of the component A was added 9.7 L of the component B. The component B was added and mixed in a fermentation tank just before a filtering process for removal of yeast in the course of production of the component A. The obtained fermented beverage was filtered sterilely and packed in a can, to produce a malt beverage of the present invention.

The obtained fermented beverage had both robust feel and crispness.

INDUSTRIAL APPLICABILITY

As described above, the present invention provides a malt fermented beverage having refreshing finish, namely clear taste while ensuring robust feel by making use proportion of malt in starting materials high. The malt fermented beverage provided by the present invention ensures robust feel from malt as beer taste, and offers crisp finish as well. Therefore, it satisfies tastes of consumers.

The invention claimed is:
1. A malt fermented beverage comprising:
an alcohol-containing material partly made of wheat or barley and produced by fermentation, serving as a component A; and
an alcohol-containing distillate obtained by distilling an alcohol-containing material at least partly made of wheat or barley, serving as a component B,
wherein the malt fermented beverage is produced by mixing the component A and the component B, and wherein a ratio between an alcohol content from the alcohol-containing material of the component A and an alcohol content from the alcohol-containing distillate of the component B is in a range of about 97.5:2.5 to about 90:10.

2. The malt fermented beverage according to claim 1, wherein at least malt is used as a starting material for the alcohol-containing material of the component A.

3. The malt fermented beverage according to claim 1, wherein the alcohol-containing material of the component A is made of starting materials comprising malt, hop and water.

4. The malt fermented beverage according to claim 3, wherein the starting materials further comprise materials selected from the group consisting of rice, corn, sorghum, white potato, starch, sugars, wheat or barley other than malt, a bittering agent, and a coloring agent.

5. The malt fermented beverage according to claim 1, wherein the alcohol-containing material of the component A is beer or a low-malt beer beverage.

6. The malt fermented beverage according to claim 1, wherein the alcohol-containing material of the component A is an alcohol-containing material having malt proportion of 20% or higher.

7. The malt fermented beverage according to claim 1, wherein the alcohol-containing material of the component A is an alcohol-containing material having malt proportion of 40% or higher.

8. The malt fermented beverage according to claim 1, wherein the alcohol-containing distillate of the component B is shochu (Japanese distilled liquor), whisky, vodka, or spirits.

9. The malt fermented beverage according to claim 1, wherein the alcohol-containing distillate of the component B is "mugi shochu" (shochu distilled from wheat or barley).

10. The malt fermented beverage according to claim 9, wherein the mugi shochu is mugi shochu that is obtained from starting materials including wheat or barley, malted wheat or malted barley, and water.

11. The malt fermented beverage according to claim 1, wherein the alcohol-containing distillate of the component B is wheat spirits.

12. The malt fermented beverage according to claim 1, wherein the alcohol-containing material of the component A is an alcohol-containing material having malt proportion of 100%, and the distillate of alcohol-containing material of the component B is otsu-rui mugi shochu.

13. The malt fermented beverage according to claim 1, wherein the alcohol-containing material of the component A is an alcohol-containing material having malt proportion of 40 to 60%, and the distillate of alcohol-containing material of the component B is wheat spirits.

14. The malt fermented beverage according to claim 1, wherein an alcohol content of the alcohol-containing distillate of the component B is from 25 to 45%.

15. The malt fermented beverage according to claim 1, wherein an alcohol content of the malt fermented beverage is from 1 to 15%.

* * * * *

UNITED STATES PATENT AND TRADEMARK OFFICE
CERTIFICATE OF CORRECTION

PATENT NO. : 8,420,149 B2  
APPLICATION NO. : 10/582336  
DATED : April 16, 2013  
INVENTOR(S) : Kakudo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2000 days.

Signed and Sealed this
First Day of September, 2015

Michelle K. Lee
*Director of the United States Patent and Trademark Office*